United States Patent [19]

Sawanobori et al.

[11] Patent Number: 4,808,556

[45] Date of Patent: Feb. 28, 1989

[54] FLUOROPHOSPHATE OPTICAL GLASS

[75] Inventors: Naruhito Sawanobori, Yono; Shinobu Nagahama, Kasukabe; Nobuyoshi Baba, Yono, all of Japan

[73] Assignee: Sumita Optical Glass Mfg. Co., Ltd., Tokyo, Japan

[21] Appl. No.: 116,680

[22] Filed: Nov. 3, 1987

[30] Foreign Application Priority Data

Dec. 8, 1986 [JP] Japan .................. 61-292092

[51] Int. Cl.$^4$ .................. C03C 3/247; C03C 4/00
[52] U.S. Cl. .................. 501/44; 501/902
[58] Field of Search .................. 501/44, 902

[56] References Cited

U.S. PATENT DOCUMENTS

| | | | |
|---|---|---|---|
| 4,358,543 | 11/1982 | Nozawa | 501/44 |
| 4,363,879 | 12/1982 | Broemer et al. | 501/44 |
| 4,427,784 | 1/1984 | Nakamura et al. | 501/44 |

FOREIGN PATENT DOCUMENTS 60-81042  5/1985  Japan .................. 501/44

Primary Examiner—Mark L. Bell
Attorney, Agent, or Firm—Wenderoth, Lind & Ponack

[57] ABSTRACT

A fluorophosphate optical glass with a low refractive index and low dispersion is provided in stable manner, which has a refractive index nd of 1.42 to 1.47 and an Abbe number νd of 90 to 97 and comprises 3 to 8 mole % of $P_2O_5$, 0.1 to 2 mole % of $Al_2O_3$, 1 to 7 mole % of BaO, 35.5 to 41 mole % of $AlF_3$, 8 to 13 mole % of $MgF_2$, 16 to 26 mole % of $CaF_2$, 15 to 21 mole % of $SrF_2$, 3.5 to 10 mole % of $BaF_2$ and 1 to 6 mole % of NaF.

1 Claim, No Drawings

FLUOROPHOSPHATE OPTICAL GLASS

BACKGROUND OF THE INVENTION

1. Field of the Invention

This invention relates to a fluorophosphate optical glass having optical constants, i.e. a refractive index (nd) of 1.42 to 1.47 and Abbe number ($\nu d$) of 90 to 97. The low refractive index and low dispersion optical glass of the present invention has similar optical properties to those of crystalline calcium fluoride and is thus useful as a glass material serving for calcium fluoride as a lens or optical part in an optical instrument.

2. Description of the Prior Art

Crystalline calcium fluoride, which has hitherto been used as a low refractive index and low dispersion optical material for a camera lens, meets with various problems because of being crystalline, for example, that the chemical resistance and workability are not good and the productivity is low to disadvantage mass production of it. In order to solve these problems, an optical glass having similar optical properties to crystalline calcium fluoride has thus been desired and some glasses have been proposed which consist of low refractive index and low dispersion fluorophosphates.

For the purpose of realizing such optical properties, in particular, a low dispersion, fluoride ion must be introduced as an anion serving for oxide ion in a glass and when the Abbe number is above 90, the proportion of the fluoride ions is considerably increased as compared with the oxide ions. Such a glass tends to be crystallized more than ordinary optical glasses and is so unstable that the production thereof on a commercial scale, as having uniform properties, is very difficult.

In view of the situation, several fluorophosphate glasses have thus been reported as disclosed in Japanese Patent Publication Nos. 34768/1979 and 14378/1983 and Japanese Patent Application OPI Nos. 43112/1975, 81042/1985 and 210545/1985. However, these glasses have such problems that large amounts of volatile components contained therein evaporate during melting, thus resulting in a fluctuation of the refractive index, and the production of those containing relatively expensive and special components, on a commercial scale, meets with an economical problem. Furthermore, the above proposed glasses are not satisfactorily in the effect for crystallization. Therefore, a great deal of efforts are required so as to obtain a sufficiently stable and uniform glass.

SUMMARY OF THE INVENTION

It is an object of the present invention to provide an optical glass with a low refractive index and low dispersion.

It is another object of the present invention to provide a very stable and uniform fluorophosphate optical glass.

These objects can be attained by a fluorophosphate optical glass having optical constants, a refractive index (nd) of 1.42 to 1.47 and an Abbe number ($\nu d$) of 90 to 97 and comprising 3.0 to 8.0% (by mole) of $P_2O_5$, 0.1 to 2.0% of $Al_2O_3$, 1.0 to 7.0% of BaO, 35.5 to 41.0% of $AlF_3$, 8.0 to 13.0% of $MgF_2$, 16.0 to 26.0% of $CaF_2$, 15.0 to 21.0% of $SrF_2$, 3.5 to 10.0% of $BaF_2$ and 1.0 to 6.0% of NaF.

DETAILED DESCRIPTION OF THE INVENTION

The inventors have made various effects to overcome the disadvantages of the prior art, as described above, and consequently, have found a very stable fluorophosphate glass having optical constants, i.e. a refractive index nd of 1.42 to 1.47 and an Abbe number $\nu d$ of 90 to 97 in $P_2O_5$-$Al_2O_3$-BaO-$AlF_3$-$RF_2$-NaF (R=Mg+Ca+Sr+Ba) systems. The present invention is based on this finding.

Accordingly, the optical glass of the present invention has a chemical composition (% by mole) comprising 3 to 8% $P_2O_5$, 0.1 to 2% $Al_2O_3$, 1 to 7% BaO, 35.5 to 41% $AlF_3$, 8 to 13% $MgF_2$, 16 to 26% $CaF_2$, 15 to 21% $SrF_2$, 3.5 to 10% $BaF_2$ and 1 to 6% NaF, and can readily be prepared in conventional manner by mixing and melting the corresponding raw materials in such a proportion as to give the above described contents.

The reasons for limiting thereto the proportions of the components are as follows:

$P_2O_5$ is a component essential for forming the glass and is in a proportion of 3.0 to 8.0% (by mole), preferably 3.5 to 6.5%, since if more than 8.0%, the optical constants of the resulting glass are outside the above described and claimed range, while if less than 3.0%, the glass is hard to be formed. $Al_2O_3$ acts as a component for increasing the viscosity of the glass melt and is in a proportion of 0.1 to 2.0%, preferably 0.2 to 1.5%, since if the proportion if outside the above described range, its effect is similar to that of $P_2O_5$. BaO is an essential component for improving the melting property of the glass and is in a proportion of 1.0 to 7.0%, preferably 1.6 to 5.0%, since if the proportion is outside the above described range, the intended optical constants cannot be obtained. $AlF_3$ is an essential component for forming the glass and acting as a source of fluoride ion and is in a proportion of 35.5 to 41.0%, preferably 35.5 to 39.0%, since if the proportion is outside this range, the crystallization tendency of the glass is increased. $MgF_2$ is in a proportion of 8.0 to 13.0%, preferably 9.0 to 12.0%, since if more than 13%, the crystallization tendency is increased, while if less than 8%, the melting property is deteriorated. $CaF_2$ is in a proportion of 16.0 to 26.0%, preferably 17.0 to 25.0%, since if more than 26%, the crystallization tendency is increased, while if less than 16%, the intended optical constants cannot be satisfied. $SrF_2$ is in a proportion of 15.0 to 21.0%, preferably 15.0 to 20.0%, since if more than 21%, the crystallization tendency is increased, while if less than 15%, the melting property is deteriorated. $BaF_2$ is in a proportion of 3.5 to 10.0%, preferably 5.0 to 9.0%, since if more than 10%, the intended optical constants can hardly be obtained, while if less than 3.5%, glass formation is difficult. NaF is an essential component for lowering the melting temperature of the glass melt and effectively preventing evaporation and is in a proportion of 1.0 to 6.0%, preferably 1.0 to 4.0%, since if more than 6%, the crystallization tendency is increased, while if less than 1%, its effects are insufficient. All of the alkali metal and alkaline earth metal fluorides are used for the purpose of improving the melting property of the glass.

A glass having a composition in the above described range according to the present invention has similar optical constants to those of crystalline calcium fluoride and can be obtained in relatively stable manner, leading to the production on a commercial scale.

Production of this glass can generally be carried out by mixing raw materials in a predetermined proportion to give the above described composition, melting the mixture at a temperature of 1000° to 1100° C. and then subjecting the melt to casting in conventional manner.

The fluorophosphate optical glass of the present invention can more readily be obtained as the so-called glass and can be produced on a commercial scale. Therefore, this glass is promising as a low refractive index and low dispersion optical material serving for crystalline calcium fluoride and useful as optical parts such as camera lens.

The following examples are given in order to illustrate the present invention in greater detail without limiting the same.

EXAMPLE 1

Compounds shown in Table 1 were used as raw materials, mixed in a proportion by weight as Sample No. 1, melted at a temperature of 1000° to 1100° C. and formed by pouring the resulting melt in a mold of carbon. A glass was thus obtained in relatively stable manner.

EXAMPLES 2 TO 8

Example 1 was repeated except using compounds in proportions shown in Table 1, Sample Nos. 2 to 8, thus obtaining glasses.

The compositions and optical constants, i.e. refractive indexes and Abbe numbers of the glasses prepared in Example 1, Sample No. 1 and Examples 2 to 8, Sample Nos. 2 to 8 are shown in Table 2:

TABLE 2

| Sample No. | $P_2O_5$ | $Al_2O_3$ | BaO | $AlF_3$ | $MgF_2$ | $CaF_2$ | $SrF_2$ | $BaF_2$ | NaF | nd | νd |
|---|---|---|---|---|---|---|---|---|---|---|---|
| | | | | (mole %) | | | | | | | |
| 1 | 7.1 | 0.3 | 6.3 | 35.8 | 8.9 | 18.0 | 15.5 | 5.7 | 2.4 | 1.45051 | 90.5 |
| 2 | 4.9 | 0.2 | 4.3 | 36.0 | 10.2 | 18.1 | 16.7 | 6.1 | 3.5 | 1.44249 | 90.7 |
| 3 | 5.7 | 0.9 | 3.3 | 40.3 | 9.3 | 16.1 | 15.4 | 5.5 | 3.5 | 1.43661 | 94.7 |
| 4 | 4.3 | 0.9 | 1.6 | 36.5 | 9.1 | 21.8 | 15.4 | 5.9 | 4.5 | 1.43154 | 94.8 |
| 5 | 3.6 | 0.1 | 3.3 | 39.8 | 9.5 | 17.0 | 15.7 | 9.0 | 2.0 | 1.42802 | 94.9 |
| 6 | 5.9 | 0.9 | 3.4 | 36.7 | 12.2 | 16.4 | 17.0 | 6.0 | 1.5 | 1.44223 | 93.1 |
| 7 | 6.5 | 1.4 | 2.3 | 36.6 | 8.0 | 17.0 | 20.2 | 6.5 | 1.5 | 1.43694 | 95.6 |
| 8 | 4.4 | 0.9 | 1.7 | 36.0 | 8.5 | 25.5 | 17.5 | 4.0 | 1.5 | 1.44232 | 94.1 |

COMPARATIVE EXAMPLE 1

Example 1 was repeated except using raw materials to give a composition of 9.9% by mole of $P_2O_5$, 2.9% $Al_2O_3$, 1.2% BaO, 23% $AlF_3$, 13.2% $MgF_2$, 21.3% $CaF_2$, 22% $SrF_2$, 6% $BaF_2$ and 0.5% NaF. The resulting glass showed optical constants, nd=1.46715 and νd=88.1.

What is claimed is:

1. A fluorophosphate optical glass having optical constants, a refractive index (nd) of 1.42 to 1.47 and an Abbe number (νd) of 90 to 97 and consisting essentially of 3 to 8 mole % of $P_2O_5$, 0.1 to 2 mole % of $Al_2O_3$, 1 to 7 mole % of BaO, 35.5 to 41 mole % of $AlF_3$, 8 to 13 mole % of $MgF_2$, 16 to 26 mole % of $CaF_2$, 15 to 21 mole % of $SrF_2$, 3.5 to 10 mole % of $BaF_2$ and 1 to 6 mole % of NaF.

* * * * *

TABLE 1

| Sample No. | $Ba(PO_3)_2$ | $Al(PO_3)_3$ | $AlF_3$ | $MgF_2$ | $CaF_2$ | $SrF_2$ | $BaF_2$ | NaF |
|---|---|---|---|---|---|---|---|---|
| | | | (gram) | | | | | |
| 1 | 18.5 | 1.5 | 30.0 | 5.5 | 14.0 | 19.5 | 10.0 | 1.0 |
| 2 | 13.0 | 1.0 | 31.0 | 6.5 | 14.5 | 21.5 | 11.0 | 1.5 |
| 3 | 10.0 | 4.5 | 35.0 | 6.0 | 13.0 | 20.0 | 10.0 | 1.5 |
| 4 | 5.0 | 5.0 | 32.5 | 6.0 | 18.0 | 20.5 | 11.0 | 2.0 |
| 5 | 10.0 | 0.5 | 33.7 | 5.9 | 13.4 | 19.9 | 15.9 | 0.8 |
| 6 | 10.2 | 4.7 | 31.4 | 7.7 | 13.0 | 21.7 | 10.7 | 0.6 |
| 7 | 6.7 | 7.5 | 30.6 | 5.0 | 13.2 | 25.2 | 11.3 | 0.6 |
| 8 | 5.2 | 5.0 | 31.9 | 5.6 | 21.0 | 23.2 | 7.4 | 0.7 |

UNITED STATES PATENT AND TRADEMARK OFFICE
CERTIFICATE OF CORRECTION

PATENT NO. : 4,808,556

DATED : February 28, 1989

INVENTOR(S) : Naruhito SAWANOBORI, Shinobu NAGAHAMA, and Nobuyoshi BABA

It is certified that error appears in the above-identified patent and that said Letters Patent is hereby corrected as shown below:

Col. 2, line 4, change "effects" to -- efforts --;

Col. 2, line 26, change "claimed" to -- aimed --;

Col. 2, line 30, after "proportion" change "if"( 2nd occurrence ) to --is--;

Signed and Sealed this

Third Day of April, 1990

Attest:

HARRY F. MANBECK, JR.

Attesting Officer

Commissioner of Patents and Trademarks